UNITED STATES PATENT OFFICE.

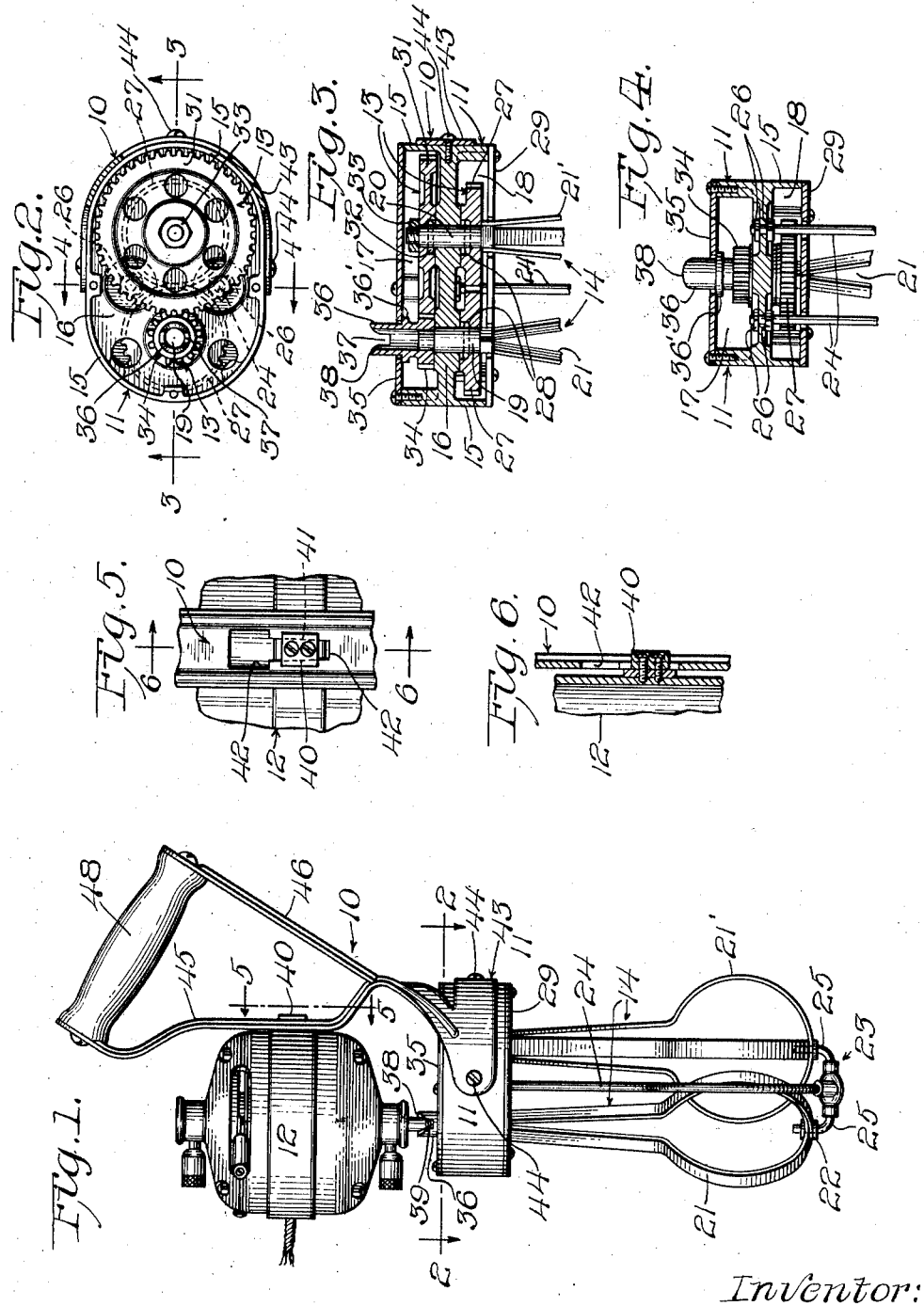

LATHROP COLLINS, OF EVANSTON, ILLINOIS.

MOTOR-DRIVEN UTENSIL.

1,372,279.  Specification of Letters Patent.  Patented Mar. 22, 1921.

Application filed January 14, 1921. Serial No. 437,164.

*To all whom it may concern:*

Be it known that I, LATHROP COLLINS, a citizen of the United States, residing at Evanston, in the county of Cook and State of Illinois, have invented certain new and useful Improvements in Motor - Driven Utensils, of which the following is a specification.

My invention relates to hand-held utensils having rotatable operating parts, such, more specifically, as egg beaters, and has for its general object to provide a construction wherein the moving parts may be motor driven. Among the objects of my invention are the correlation of the driven elements, handle, and motor for quick detachability of the latter, but with normal rigorous maintenance of the operative relation between the parts; organization for effective balance and ease of handling; simplicity and ease of construction; facility in assembling and dismantling the parts in the initial construction and for cleaning or replacement; efficient and advantageous construction of the driving gearing and driven elements, and effective mounting of the gearing and driven elements. Further objects will become apparent to those skilled in the art from the following description taken in conjunction with the accompanying drawings showing one embodiment of my invention for purposes of disclosure.

In the drawings Figure 1 is a side elevation of a motor-equipped egg beater; Fig. 2 is a horizontal section on line 2—2 of Fig. 1; Fig. 3 is a vertical section on line 3—3 of Fig. 2; Fig. 4 is a vertical section on line 4—4 of Fig. 2; Fig. 5 is an enlarged detail of a split connection between the motor frame and handle; and Fig. 6 is a vertical section on line 6—6 of Fig. 5.

The device illustrated comprises generally a handle structure 10 to be carried and positioned by the operator, gear casing 11 secured to the handle and forming the body of the frame; electric motor 12 positioned demountably in the frame to coact with the casing-contained gearing 13; and the parts, 14, to be driven.

The frame body, or gear casing, 11, is a horizontally disposed casting providing side walls 15 preferably of oval form, with a horizontal partition or septum separating the upper and lower chambers 17 and 18.

Through vertical bearing apertures in the partition extend shafts 19 and 20 of the duplicate driven elements or beaters 21, 21', shown as of the "Dover" egg beater type, each with its blade bows secured at their crossing point by a tubular rivet 22, the convergent upper ends of the blades of each beater being directly secured, as by brazing or otherwise, to the appropriate squared lower end of its shaft. To give bearing to the lower ends of the beaters the wire beater-frame 23 is provided as a wire loop 24, suitably bowed for clearance of the beater blades, its lower end carrying the short upturned studs 25 that enter the tubular rivets 22 and afford the requisite bearing for rotation, while the upper ends of the wire, extending in parallel relation into the gear casing as shown in Fig. 4, have their extremities threaded, passed through holes in the partition 16, and provided with nuts 26 above and below the partition, these nuts being located in appropriate recesses made in the partition. By unscrewing the upper nuts the beater-frame may readily be detached, and by suitable adjustment of the upper and lower nuts bearing studs 25 may be brought into accurate alinement with the shafts 19 and 20.

Below the septum the two shafts are connected by the meshed duplicate gears 27, each held against rotation on its shaft preferably by a pin 28 engaging a suitable transverse recess in its gear. A lower cover plate 29 for the chamber 18 is made in duplicate sections meeting on the longitudinal axis of the casing, and provided with suitable apertures for the wire frame 24 and half-apertures for the beater members, the cover plate being retained by screws engaging the walls 15.

Within the upper chamber 17 shaft 20 has secured thereon a large gear 31, positioned as by the pin 32 and nut 33, this gear meshing with a driving pinion 34 that is rotatively loose on the reduced extremity of shaft 19. A cover plate 35 is screwed on to cover the chamber 17 and is provided with a single opening through which projects the clutch collar 36 fixed to the gear 34 as a hub extension, this collar having a flange 36' to underlie the margin of the cover opening. The top of the axially open collar is transversely notched as at 37 and cam arched as at 38 to coact with the cross pin 39 near the end of the shaft of motor 12, said shaft being of a size to slip into the collar.

Motor 12 may be of any suitable construction, preferably with a generally cylindrical shell and is demountably carried, in vertical alinement with the shaft 19, by the handle 10, the motor carrying frame having preferably about the middle of its height, a rectangular, headed stud or lug 40 with its body portion 41 slightly tapered from top to bottom to interfit with and wedge in the correspondingly tapered lower portion of the keyhole slot 42 that is made in the vertically disposed receptive portion of handle 10, this portion of the handle, of course, being of a thickness just to slide under the head of the lug. The handle structure, as shown, preferably comprises a base portion 43 embracing a large portion of the perimeter of the gear casing 11 and secured thereto by screws 44 that enter the partition-strengthened portion of said casing, a front leg 45 that is bent forwardly and then rises vertically for a distance including the key-hole slot 42, a rear brace 46 meeting the first described handle portion at the point where the latter bends forwardly, and a suitable grip 48 connecting the front leg and rear brace above the level of the motor. The metallic portions of the handle are preferably struck from sheet-metal, suitably ribbed for strength, and it will be observed that with the construction described, and as shown, the utensil is balanced with respect to the handle so that its beaters may be held in generally vertical position without any strain on the operator.

In operation the motor speed is reduced by the gearing 34, 33, independently of any speed control afforded by the motor and the construction insures smooth running operation. The motor may be detached by simply drawing it upward, bringing the head of its attaching lug 40 opposite the upper enlargement of the key-hole slot 42, and when the motor is replaced the cam curvature 38 directs its pin 39 into the collar slot, while the taper of the lug 40 and handle slot accurately bring the motor into intended position and hold it firmly against unintentional loosening.

While I have herein described in considerable detail a specific embodiment of my invention it will be understood by those skilled in the art that changes may be made in the details of construction without departure from the spirit of my invention within the scope of the appended claims.

I claim:

1. The combination of a horizontal gear casing, a handle secured thereto having an upright member, a motor positioned upright by said member, a pair of upright shafts in the gear-casing, beater-members secured to said shaft and extending below the gear casing, and, within the casing, a reduction-gearing operatively connected with the motor and with one said shaft and gearing connecting the two shafts.

2. The combination of a horizontal gear casing, a handle secured thereto having an upright member, a motor positioned upright by said member, a pair of upright shafts in the gear-casing, beater-members secured to said shafts and extending below the gear casing, said casing divided by a horizontal partition in which said shafts bear and containing, above the partition a reduction-gearing operatively connected with the motor and below the partition gearing connecting said two shafts.

3. The combination of a horizontal gear casing, a handle secured thereto having an upright member, a motor quick-detachably connected to and positioned upright by said member, a pair of upright shafts in the gear-casing, beater-members secured to said shafts and extending below the gear casing, and, within the casing, a reduction-gearing operatively and quick-detachably connected with the motor and with one said shaft and gearing connecting the two shafts.

4. The combination of a horizontal gear-casing, a handle secured thereto having an upright member attached to the rear portion of the casing and also having a grip, an electric motor vertically disposed in front of said handle, the motor and upright handle-member having mutual provision for quick engagement and detachment, reduction-gearing in said casing having a shaft to be driven, it and the motor-shaft having mutual provision for quick connection and detachment, and an agitator element operatively connected with the gearing.

5. The combination of a horizontal gear-casing, a handle secured thereto having an upright member attached to the rear portion of the casing and also having a grip, an electric motor vertically disposed in front of said handle, the motor having a headed stud and the upright handle-member having a coöperative keyhole-slot for quick engagement and detachment, reduction-gearing in said casing having a shaft to be driven, it and the motor-shaft having mutual provision for quick connection and detachment, and an agitator element operatively connected with the gearing.

6. The combination of a horizontal gear-casing, a handle secured thereto having an upright member attached to the rear portion of the casing and also having a grip, an electric motor vertically disposed in front of said handle, the motor having a headed stud and upright handle-member having a coöperative keyhole slot, the slot and stud having tapered, wedging side walls arranged for quick engagement and detachment, reduction-gearing in said casing having a shaft to be driven, it and the motor-shaft having mutual provision for quick connection and detachment, and an agitator element operatively connected with the gearing.

7. A motor-driven egg-beater comprising in combination, a pair of "Dover" beater-structures, a frame therefor comprising a wire bow exterior to and between the axes of the beaters said bow having parallel upper ends and at its bottom having short lateral studs on which the beater-structures pivot, a horizontal gear casing having a wall to receive the upper ends of the bow, means to independently adjust the upper ends of the bow with respect to said wall, gearing in said casing connecting the beater structures, a handle secured to said casing, and an electric motor above said casing coöperatively connected to drive said gearing.

8. In a motor-driven egg-beater, a gear casing, a beater structure depending below the casing, gearing in the casing operatively connected with said beater structure, a handle rising from the gear casing, and an electric motor wholly supported by said handle and quick-detachably connected therewith, the shaft of said motor having operative quick-detachable connection with the beater-driving gearing.

9. The combination of a handle structure having an upwardly extending member, a gear casing carried on the lower portion of said upwardly-extending member, a motor positioned by said upwardly-extending member and having an upright shaft, a member to be driven extending below the gear-casing, and gearing in said casing operatively connected with said member-to-be-driven and with the motor shaft.

10. The combination of a handle structure having an upwardly extending member, a gear casing carried on the lower portion of said upwardly-extending member, a motor quick-detachably connected with and positioned by said upwardly-extending member and having an upright shaft, a member to be driven extending below the gear-casing, and gearing in said casing operatively connected with said member-to-be-driven and having quick detachable connection with the motor shaft.

11. The combination of a handle structure having an upwardly extending member, a gear casing carried on the lower portion of said upwardly-extending member, a motor having an upright shaft, said motor and handle-member having coacting stud and vertical-slot provision for quick detachment of the motor, a member to be rotated extending below the gear casing, and speed changing gearing in said casing operatively connected with said member-to-be-rotated, and having vertically-separable rotative connection with the motor-shaft.

12. The combination of a horizontal gear casing; a handle secured thereto having an upright member; a pair of upright shafts in the gear casing; members to be rotated secured to said shafts and extending below the gear casing; gearing interconnecting said shafts and speed-change gearing operatively connected with one shaft, located within the casing; and a motor positioned upright by said handle-member and operatively connected with said speed-change gearing.

13. In a hand-portable, motor driven agitator, a casing having a handle rising therefrom, an agitator element sustained by said casing and projecting therefrom, and an electric motor, supported from said handle and having quick-detachable connection therewith, the shaft of said motor having quick-detachable operative connection to drive said agitator element.

14. In a hand-portable, motor driven agitator, a casing having a handle rising from its rear portion and having a grip, an agitator element sustained by said casing and depending therefrom, and an electric motor in front of and supported from said handle and having quick-detachable connection therewith, the shaft of said motor having quick-detachable operative connection to drive said agitator element.

LATHROP COLLINS.